United States Patent
Raghu et al.

(10) Patent No.: US 9,407,641 B2
(45) Date of Patent: Aug. 2, 2016

(54) SERVICE ACCESS CONTROL

(75) Inventors: Anantharangachar Raghu, Bangalore (IN); Viswanathan Kapaleeswaran, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/394,326

(22) PCT Filed: Apr. 27, 2012

(86) PCT No.: PCT/IN2012/000315
§ 371 (c)(1),
(2), (4) Date: Oct. 14, 2014

(87) PCT Pub. No.: WO2013/160905
PCT Pub. Date: Oct. 31, 2013

(65) Prior Publication Data
US 2015/0082388 A1    Mar. 19, 2015

(51) Int. Cl.
*G06F 17/30* (2006.01)
*H04L 29/06* (2006.01)
*H04W 12/02* (2009.01)
*H04W 12/08* (2009.01)
*H04L 29/12* (2006.01)

(52) U.S. Cl.
CPC ............ *H04L 63/104* (2013.01); *H04L 61/35* (2013.01); *H04W 12/02* (2013.01); *H04W 12/08* (2013.01)

(58) Field of Classification Search
CPC .................................................... H04L 63/104
USPC ............................................................ 726/4
See application file for complete search history.

(56) References Cited

U.S. PATENT DOCUMENTS

| 5,905,872 | A | * | 5/1999 | DeSimone | .......... H04L 12/5692 370/401 |
| 7,886,038 | B2 | | 2/2011 | Ferris | |
| 2002/0161884 | A1 | * | 10/2002 | Munger | .............. H04L 61/2007 709/224 |
| 2004/0122910 | A1 | * | 6/2004 | Douglass et al. | ............. 709/214 |
| 2005/0055570 | A1 | | 3/2005 | Kwan et al. | |

(Continued)

FOREIGN PATENT DOCUMENTS

| CN | 101005359 | 7/2007 |
| CN | 101119206 | 2/2008 |

(Continued)

OTHER PUBLICATIONS

Aura, Tuomas. "Cryptographically Generated Addresses (CGA)." Information Security, 6th International Conference, ISC 2003, Bristol, UK, Oct. 1-3, 2003, Proceedings. 2003.

(Continued)

*Primary Examiner* — Peter Shaw
(74) *Attorney, Agent, or Firm* — HP Inc Patent Department

(57) ABSTRACT

Embodiments of the present invention provide a service access control system having a service object for providing services, a messaging service facility and one or more spoke entities for accessing services provided by the service object, wherein the messaging service facility comprises one or more cells each having an input address and an output address, wherein at least one of the input address and the output address is linked to the other via a cryptographic key, the cell providing a message communication link between the spoke entity and a set of functions on the service object associated with the cell.

12 Claims, 3 Drawing Sheets

(56) References Cited

U.S. PATENT DOCUMENTS

| | | | |
|---|---|---|---|
| 2011/0087726 A1 | 4/2011 | Shim et al. | |
| 2011/0137947 A1 | 6/2011 | Dawson et al. | |
| 2011/0231915 A1* | 9/2011 | Lum et al. | 726/7 |
| 2012/0079095 A1 | 3/2012 | Evans et al. | |

FOREIGN PATENT DOCUMENTS

| | | |
|---|---|---|
| WO | WO-2007088174 A1 | 8/2007 |
| WO | WO-2011159842 | 12/2011 |

OTHER PUBLICATIONS

European Search Report, Hewlett-Packard Development Company, L.P. EP Patent Application No. 12875328.2, Report issued Apr. 1, 2015.

Drobo How-To Guide: Use a Drobo and Pogoplug Software to Create a Personal Cloud, www.drobo.com, 14 Pages [retrieved on Sep. 25, 2014], Retrieved from the Internet: <http://www.buydrobo.com/cloud_info/pogoplug_personal.pdf>.

English translation (machine-generated) of Abstract from Chinese Patent Publication No. 101005359 [retrieved on Sep. 25, 2014], Retrieved from the Internet: <http://worldwide.espacenet.com/publicationDetails/biblio?DB=EPODOC&II=0&ND=3&adjacent=true&locale=en_EP&FT=D&date=20070725&CC=CN&NR=101005359A&KC=A>.

English translation (machine-generated) of Abstract from Chinese Patent Publication No. 101119206 [retrieved on Sep. 25, 2014], Retrieved from the Internet: <http://worldwide.espacenet.com/publicationDetails/biblio?DB=worldwide.espacenet.com &II=0&ND=3&adjacent=true&locale=en EP&FT=D&date=20080206&CC=CN&NR=101119206A&KC=A>.

International Search Report and Written Opinion, Feb. 7, 2013. Hewlett-Packard Development Company, L.P., PCT Application No. PCT/IN2012/000315, Beijing, China, 10 pages.

* cited by examiner

SERVICE ACCESS CONTROL

CROSS-REFERENCE TO RELATED APPLICATION

This application is a U.S. National Stage Application of and claims priority to International Patent Application No. PCT/IN2012/000315, filed on Apr. 27, 2012, and entitled "SERVICE ACCESS CONTROL."

BACKGROUND

In a distributed computing system services are provided by computing devices to other, potentially remote, client computing devices. Distributed computing has been found in many applications such as, for example, social networking, online digital mapping, video-sharing websites, collaborative software, remote printing etc. The provision of services in a distributed computing environment has been referred to as software as a service (SaaS). It is often desired to control the services which client computing devices may access, and those client computing devices which may access services.

Access control lists have been used to provide group security management. An access control list (ACL) provides a list of authorised entities as well as every object in the system. An access control monitor may look to the list and determine what entities can or cannot access, share or destroy any object. However use of ACLs requires a reasonable level of expertise and does not therefore offer a simple method to control access to services. Furthermore, the size of an ACL is related to the number of devices which have been granted access to objects in the system and may become large.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Figure 1:
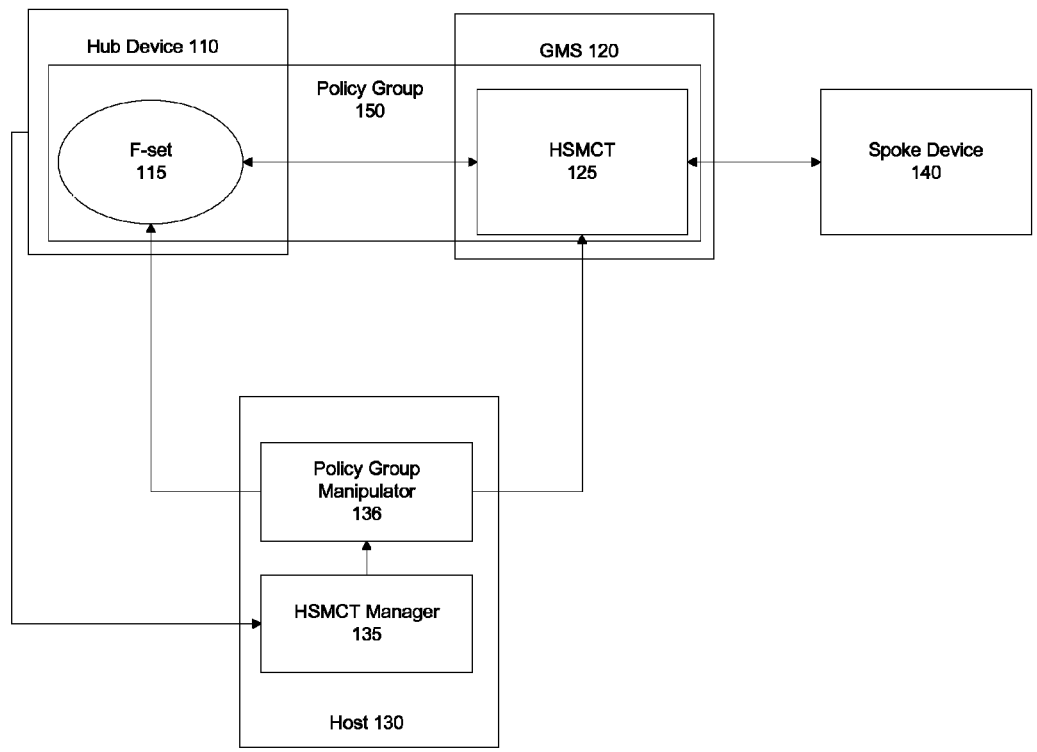
FIG. 1 shows a system according to an embodiment of the invention.

FIG. 1 illustrates a system for secure access of services according to an embodiment of the invention. To illustrate the principles of the present invention the example system will be described with reference to accessing functions supported or provided by a device. The device may be a hardware device such as, for example, a printer, a mobile phone, tablet, personal computer, network-connected printer, TV set-top box or other device which may provide one or more services. It will be realised that in some embodiments of the invention the one or more services may be provided by a software object, such as a chat or social media, video sharing or collaborative software object, for example. Thus the term object used herein may refer to a hardware device or software object. To describe embodiments of the present invention the system will be explained with reference to a network-connected printer which provides printing services to one or more users. Users may access the services provided by the printer using a remotely connected device, such as a print application operably residing on a smart phone. However it will be realised that this is merely illustrative.

The system comprises a hub device 110, which is an object that provides one or more services. In the illustrative example the hub device 110 is the printer noted above. The system further comprises a group message system (GMS) server 120, a host 130 and a spoke device 140 which is a device that accesses at least some of the services provided by the hub device 110, such as the mobile phone mentioned above. Although embodiments of the present invention are described with reference to hub 110 and spoke 140 devices, it will be realised that embodiments of the invention may be envisaged which comprise only one hub device 110 and one spoke device 140.

The GMS 120 is a central message facility which facilitates secure messaging communication. The GMS 120 provides a secure message communication facility between individual and groups of devices, as will be explained. In particular, the GMS 120 provides one or more communication links having an input address and an output address, wherein at least one of the input address and the output address is linked to the other via a cryptographic key. The input and output addresses are randomised numbers such that the spoke device 140 only knows the input address and cannot compute the output address for the link. The hub device 110 receives communications from the output address of the link which are sent to the input address by the spoke device 140.

The host 130 comprises a hub-and-spoke message communication topologies (HSMCT) manager 135 and a policy group manipulator (PGM) 136. The host 130 may be implemented within the hub device 110 or may be accessible to the hub device 110 over a network, such as the Internet, and implemented on at least one remote server. For the purposes of explanation, the host 130 will be described as implemented as a cloud service which is accessible to a user of the hub device 110 through an interface of the hub device 110 which communicates with the HSMCT manager 135 and consequently the PGM 136 via a suitable API. For example, the hub device 110 may support a web browser which allows the user to access the HSMCT manager 135. It will be further realised that a user may also access the HSMCT manager 135 without use of the hub device 110 i.e. via a web browser supported by another device. In other embodiments the HSMCT manager 135 and PGM 136 may be integrated into a single entity.

Figure 3:
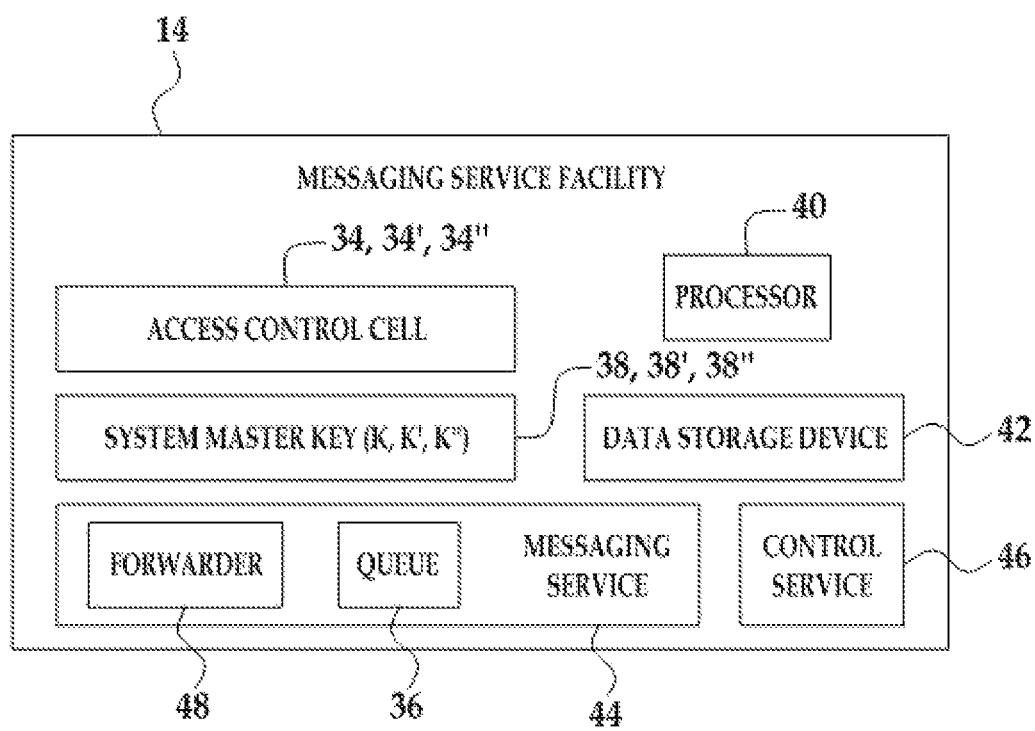
FIG. 3 shows a messaging service according to an embodiment of the invention.

The HSMCT manager 135, as shown in FIG. 3, is controlled by the user via the hub device 110 to cause the PGM 136 to create one or more policy groups 150. A policy group 150 is provided for controlling access to services of the hub device 110. In particular, the policy group controls which spoke devices 140 may access services provided by the hub device 110, and the services of the hub device 110 which may be accessed by those spoke devices 140.

Each policy group 150 is identified by a policy group name and may also be associated with a policy group description. The policy group name and description allow the user to identify the policy group 150 and the purpose of the policy group. For example, policy groups may be established for the printer 110 having policy group names of "Family" and "Friends". The associated descriptions may identify to the user that, for example, members of the "Family" policy group are allowed to access a colour printing service provided by the printer 110 whilst members of the "Friends" policy group are only able to access a black and white print service provided by the printer 110. The policy group name and description may be altered by the user at any time without affecting the operation of the policy group, or having to communicate the changes to spoke devices 140.

Each policy group comprises an f-set 115 and a hub-and-spoke message communication topology HSMCT 125. The f-set 115 is logically connected to the HSMCT 125 by the hub device 110. As will be explained, the HSMCT 125 securely controls message communication between the spoke device 140, the hub device 110 and the f-set 115 residing on the hub device 110. The f-set 115 defines which functions may be accessed on the hub device 110 and therefore represents a set of functions accessible on the hub device 110 by members of the policy group 150. Functions of the hub device 110 may be added to, or removed from, the f-set 115 by the user of the hub device 110 accessing the HSMCT manager 125.

The HSMCT 125 defines zero or more spoke devices 140 which may access the functions included within the associated f-set 115. The user of the hub device 110 may add or remove spoke devices 140 to/from the HSMCT 125 via the HSMCT manager 135. Each spoke device 140 is uniquely identified to the HSMCT 125 by unique identifying information such as a public key, system account name, mobile phone number etc associated with the spoke device 140. Therefore a spoke device 140 is able to access a function, such as the colour printing function, of the hub device 110 if the spoke device 140 is included in the HSMCT 125 and the function is included within the corresponding f-set 115.

The HSMCT 125 is a structure which allows message communication between the spoke device 140 and the f-set 115 associated with the HSMCT 125. The HSMCT 125 defines a message communication switchboard which is implemented by the GMS 120 allowing the spoke 140 and hub 110 devices to communicate. Specifically, the HSMCT 125 allows spoke devices 140 to access the f-set 115 of functions on the hub device 110. The HSMCT 125 uses low-level data structures referred to as cells. As will be explained, a cell has a random input address and a random output address, wherein the output address may be cryptographically computed from the input address, or visa versa, using a cryptographic key. In this way, an unauthorised device does not have knowledge of a valid input address and cannot compute the output address without the cryptographic key. Knowledge of the input address is assumed to be authorisation to access the functions defined by the f-set 115.

Figure 2:
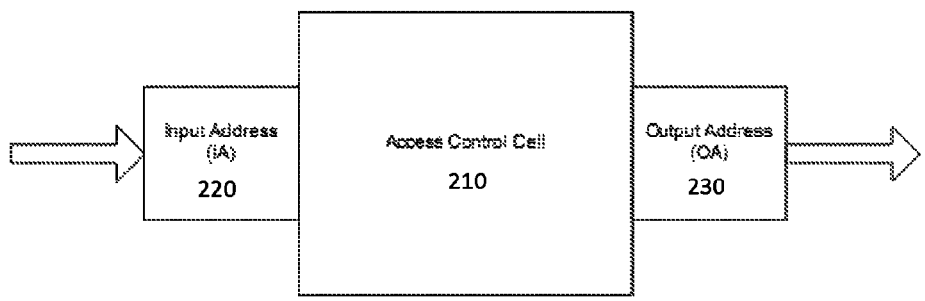
FIG. 2 shows a cell according to an embodiment of the invention.

Application PCT/IN2011/000257 entitled "Access Control", which is herein incorporated by reference in its entirety, discloses an access control system comprising a trusted micro-kernel for a distributed message passing system between many clients. The system includes cells 210, one of which is shown in FIG. 2, which may receive data from an input address (IA) 220 and send data from an output address (OA) 230, both of which are randomised by cryptographic numbers. The cell 210 represents a communication capability described by the tuple (IA, OA) such that the output address 230 cannot be computed knowing the input address 220 and visa versa without the possession of a secret cryptography key which is possessed by the kernel.

Users or entities in possession of the input address (IA) 220 can send or write messages to the cell 210 and entities in possession of the output address (OA) 230 can receive or read messages from the cell 210. However, entities in possession of the input address (IA) 220 cannot receive or read messages from the cell without the output address (OA) 230, and entities in possession of the output address (OA) 230 cannot send or write messages to the cell without the input address (IA) 220.

Application PCT/IN2011/000731 entitled "A Communication Access Control System", which is herein incorporated by reference in its entirety, discloses a system which includes a trusted central message service facility 14, an embodiment of which is shown in FIG. 3. The message service facility 140 provides a messaging service and a control service that are decentralized so that clients can create and manage groups and group communications without interference from the trusted central facility.

The message service (MS) facility 14 may be implemented by a hardware device including a processor 40 and data storage 42.

The central facility includes a number of cells 34, 34', 34", as discussed above, which are dynamically created when needed based on a number of cryptographic rules. The facility 14 includes one or more master keys 38, 38', 38" which are used to calculate, for example, the OA 230 from the IA 220. Users or entities in possession of the input address IA 220 can send or write messages to the cell 34, and entities in possession of the output address OA 230 can receive or read messages from the cell 34. However, entities in possession of the input address IA without the output address OA cannot receive or read messages from the cell, and entities in possession of the output address OA without the input address IA cannot send or write messages to the cell. In this way, the central facility 14 provides assurances to the users that messages sent to random cells will be dropped without ever being read. Each cell 34 is a virtual switchboard that users of the central facility may use to virtually connect or disconnect their computing devices.

The MS facility 14 also includes a messaging service 44 and a control service 46. The messaging service 44 allows clients to send messages to one or more other clients. The control service 46 allows clients 12 to perform communication control (e.g., read control and/or write control). The messaging service 22 includes at least a forwarder 48 and a queue 36, and a set of queries for writing to the forwarder 48 and reading from the queue 36. The forwarder 48 includes computer readable instructions that copy message(s) received at the forwarder 48, and transmit the copied message(s) to multiple cells 34, 34', 34" that are linked to the forwarder 48. The forwarder 48 enables a user 12 to generate a single message and have it sent to multiple different cells 34, 34', 34". The forwarder 48 is associated with a forwarder address that can be attached to the input address of one or more cells 34, 34', 34" of the same or different type. The queue 36 includes computer readable instructions (embedded on a non-transitory, tangible computer readable medium) that retrieve messages sent to a cell 34, 34', 34" associated with the queue 36 from one or more cells 34, 34', 34" of the same or different type. The queue 36 enables a user 12 to retrieve all of his/her messages that have been sent from multiple different cells 34, 34', 34". The control service 46 defines the links between the cells 34, 34', 34", queues 36, and forwarders 48, as well as the set of queries for adding, removing and discovering these links. A variety of links may be formed, directly or indirectly, between the cells, thus enabling the formation of groups that contain different users, and in some instances, different devices. Device to device communication i.e. unicast communication may also be provided by the messaging facility 14. The message facility 14 is implemented in embodiments of the present invention by the GMS 120.

The HSMCT 125 defines unicast communication paths between the hub device 110 and each spoke device 140. The unicast communication paths comprise, for each spoke device 140, a pair of unidirectional communication channels each implemented by a corresponding cell 210. The unicast communication paths allow communication between the spoke device 140 and the f-set 115 to access functions on the hub device 110. The HSMCT 125 may also define multicast communication paths between the hub device 110 and spoke devices 140. To implement the multicast communication the HSMCT 125 defines a group comprising the hub device 110 and spoke devices 140 of the policy group 150. The multicast communication allows the hub device 110 to communicate information in a multicast manner to spoke devices 140 associated with the HSMCT 125. The multicast communication paths may also allow spoke devices 140 to broadcast information to other spoke devices associated with the HSMCT 125 and the hub device 110.

The hub device 110 adds a spoke device 140 to the HSMCT 125 by creating unicast read and write addresses in the HSMCT 125 by generating one or more corresponding cells 210. The hub device 110 may also create one or both of read and/or write multicast addresses on the HSMCT 125 for the spoke device 140, as will be explained. The hub device 110 may also create a write multicast address on the HSMCT 125 for the spoke device 140. The addresses may be created by the hub device 110 communicating with the HSMCT Manager 135. The HSMCT manager 135 consequently controls the PGM 136 to communicate with the GMS 120 by sending a get cell query message to the GMS 120 to cause the creation of one or more cells 210 each having an IA 220 and OA 230. The necessary addresses, such as an IA 220 for communication with the f-set 115, are then communicated to the spoke device 140, such as by via an out-of-band channel. The necessary addresses are also communicated to the hub device 110, such as the corresponding OA 230 for the input address. The out-of-band channel may be, for example, email or via the GMS 120 itself.

The GMS 120 may create cells in the HSMCT 125 in response to the received get cell query messages. The GMS 120 may create one of the IA 220 or the OA 230 of the cell in a pseudorandom manner, such as by using a cryptographically secure PseudoRandom Bit Generator (PRBG). Illustratively, the GMS 120 may create the OA 230 using the PRBG. Subsequently the IA 220 is created based upon the OA 230. The IA 220 is a randomised input address which may be generated in some embodiments using a symmetric key encryption method such as, for example, the US National Institute of Standards and Technology's Advanced Encryption Standard with a key size of 256 bits ($AES_{256}$). The IA may be generated according to:

$$IA = E(K, OA)$$

Where E is a symmetric encryption method and K is a system master key possessed by the GMS 120.

Alternatively, one of the IA 220 or the OA 230 may be computed based upon a public key associated with the spoke device 140. The public key associated with the spoke device 140 may be obtained by the GMS 120. With the public key, the GMS 120 may compute one of the OA 230 or the IA 220 using a hash function based upon the public key. The other of the IA 220 or the OA 230 may then be computed as described above using the symmetric key encryption method and the system master key K.

The hub device 110 may also revoke access for a spoke device 140 by deleting the created addresses for that spoke from the HSMCT 125. Thus the hub device 110 can control the capability of spoke devices 140 to communicate with the f-set 115 of the policy group 150 via the HSMCT 125.

Figure 4:
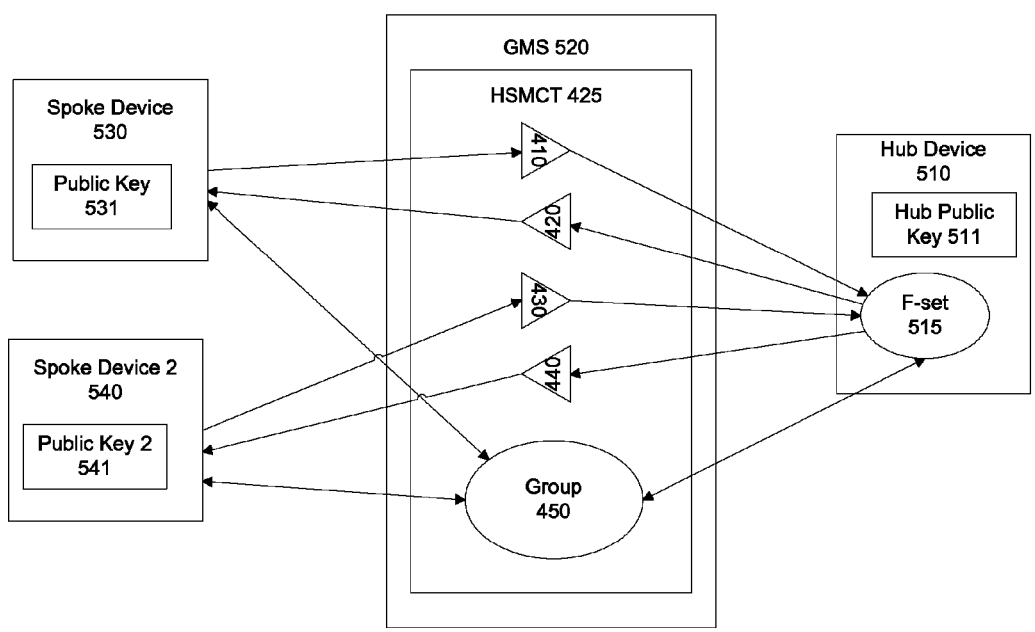
FIG. 4 shows an illustration of communication channels according to an embodiment of the invention.

FIG. 4 illustrates an exemplary system according to an embodiment of the invention. The exemplary system includes a hub device 510 having a public key 511 and an f-set 515, a GMS 520 supporting a HSMCT 425 of a policy group, and two spoke devices 530, 540 each having a corresponding public key 531, 541. It will be realised that the system may comprise other numbers of spoke devices.

The HSMCT 425 includes two pairs of cells 410, 420, 430, 440 allowing communication between the spoke devices 530, 540 and the hub device 510. A first pair of cells 410, 420 allows communication between a first of the spoke devices 530 and the hub device 510 such that the first spoke device 530 may access services having functions included within the f-set 515 of the policy group. The first pair of cells 410, 420 includes two unidirectional cells arranged in opposed directions. Similarly a second of the spoke devices 540 is associated with two unidirectional cells 430, 440 such that the second spoke device 540 may access services included within the f-set 515.

The HSMCT 425 further comprises a group cell structure 450. The group cell structure 450 is formed by appropriately connected cells on the GMS 520. In the example shown in FIG. 4, the group cell structure 450 allows spoke devices 530, 540 to write to the group cell structure, such that a message is broadcast to the other spoke devices 530, 540 and the hub device 510, and also so that the hub device 510 may broadcast messages to all spoke devices 530, 540. However in other embodiments the spoke devices 530, 540 may only have read access to the broadcast cell structure 450 to receive messages broadcast from the hub device 510.

As explained in the cited references, the group cell structure 450 of the HSMCT 425 is formed as a managed group with the HSMCT (not shown in FIG. 4) as group manager. In order to establish the group, the HSMCT manager 135 receives the public keys 511, 531, 541 of the hub device 510 and spoke devices 530, 540. The HSMCT manager 135 sends a group creation request to the GMS 520 containing the public keys 511, 531, 541 of readers to be added to the group and writers to be added to the group and a public key of the HSMCT manager. The group creation request may also contain a challenge response as explained in the cited references to ensure that the request is fresh. In response to the group creation request, the GMS 520 creates a group cell (GC) for the group having randomised input IAGC and output OAGC addresses. A cell is then created for each writer to the group, referred to as group write cells (GWCs) and for each reader to the group, referred to as group read cells (GRCs). The GWCs and GRCs have randomised input and output addresses. A manager cell (MC) is also created for the HSMCT manager, the hub device 510. The GWCs are then connected to the GC 520 such that any messages sent to the GWCs are sent to the input address IAGC of the GC. Similarly, the output addresses of the group cell OAGC is connected to input addresses of the GRCs such that messages output from the GC are sent to the GRCs. The manager cell is used by the HSMCT manager 135 to edit membership of the group. Further details are provided in the cited references.

Following establishment of the HSMCT 425 sets of information are sent to each of the spoke devices 530, 540, the hub device 510 and the HSMCT manager 135. The information contains read and write addresses for unicast and multicast communication between the spoke devices 530, 540 and the hub device 510, and the HSMCT manager 135.

In the exemplary system shown in FIG. 4, each spoke device 530, 540 stores spoke address information for communication with the hub device 510 via the HSMCT 425. The spoke HSMCT address information comprises a spoke send address, a spoke receive address, a spoke multicast send address, a spoke multicast receive address. The spoke address information for each spoke device 530, 540 is securely stored as a secret for that spoke address. Thus for the first spoke device 530 the spoke send address is the IA of cell 410, the spoke receive address is the OA of cell 420, the spoke multicast send address is the IA of group cell structure 450 and the spoke multicast receive address is the OA of group cell structure 450. The spoke address information may be stored as a tuple such as: Spoke_HSMCT_address:=(spoke send address, spoke receive address, spoke multicast-receive address, spoke multicast-send address).

Similarly, the hub device 510 stores hub address information which comprises an address of the HSMCT 425, send and receive multicast addresses and send and receive addresses for each spoke device 530, 540. The hub HSMCT address information may be stored as an address tuple of the form: Hub_HSMCT_address:=(HSMCT address, multicast-send address, multicast-receive address, {(spoke name, send address, receive address)}. The HSMCT address is a secret known only to the hub device for managing the HSMCT 425. The multicast send and receive addresses have the same function as for the spoke devices. The Hub device 510 uses the respective spoke send and receive addresses to communicate with the spoke device 530, 540. The hub address information is a secret for the hub device.

As shown in FIG. 4, each of the hub 510, and spoke devices 530, 540 has a public key 511, 531, 541. The public keys may be uncertified. The public keys are used to allow secure communication of HSMCT addresses to that device, such as from the hub device 510 to the spoke devices 530, 540.

The system of FIG. 4 may run various application protocols between the spoke devices 530, 540 and the hub device 510 to support functions identified in the f-set 515. Exemplary application protocols are printing, chat, file store and access which are supported by the hub device 510.

Embodiments of the present invention enable the control of access to functions on a service object, such as a hardware device or software object. Access is controlled by adding or removing client entities, such as spoke devices, to a policy group associated with a set of functions of the service object. More than one policy group may be created to enable differing groups of client entities to access differing groups of functions on the service object.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A service access control system, comprising:
service objects implemented at least in hardware for providing services to spoke entities that are implemented at least in hardware;
a messaging service facility that is implemented at least in hardware, and through which the spoke entities communicate with the service objects;
wherein the messaging service facility comprises cells each having an input address and an output address that are both randomized addresses and wherein the output address is computed from the input address using a cryptographic key and vice-versa;
wherein each cell is associated with one of the service objects and provides a message communication link between the spoke entities and the associated service object;
wherein the spoke entities make service requests to the associated service object using the input address and the associated service object retrieves the service requests using the output address; and
wherein the messaging service facility ensures that the input address is not revealed to the service object and the output address is not revealed to the spoke entities.

2. The service access control system of claim 1, wherein the messaging service facility comprises first and second cells associated with each spoke device, wherein an input address of the first cell and an output address of the second cell is stored in storage associated with the spoke entity.

3. The service access control system of claim 2, wherein an input address of the second cell and an output address of the first cell is stored in storage associated with the service object.

4. The service access control system of claim 1, wherein the messaging service facility comprises a group structure arranged to broadcast received messages to the spoke entities.

5. The service access control system of claim 4, wherein an input address of the group structure is stored in storage associated with the associated service object such that the associated service object is able to broadcast messages to the spoke entities.

6. The service access control system of claim 5, comprising one or more policy groups each associated with one or more policy group cells of the messaging service facility and a set of functions of the associated service object, wherein the policy group cells are arranged to allow messaging communication between a spoke device having a valid input addresses for the policy group cells and functions of the associated service object.

7. The service control system of claim 6, comprising first and second policy groups, wherein the first policy group is associated with a first subset of functions of the associated service object and the second policy group is associated with a second subset of functions of the associated service object.

8. The service control system of claim 7, wherein the first policy group comprises a first particular cell for allowing a first spoke entity to communicate with the first subset of functions and the second policy group comprises a second particular cell for allowing a second spoke entity to communicate with the second subset of functions.

9. A method for accessing services, comprising:
receiving, by a messaging service facility implemented at least in hardware and through which spoke entities communicate with service objects, at an input address of a particular cell of the messaging service facility a service message from a particular spoke entity requesting a service provided by an associated service object, the particular cell being one of a plurality of cells each having an input address and an output address that are both randomized addresses and wherein the output address is computed from the input address using a cryptographic key and vice-versa;
determining, by the messaging service facility, the output address of the particular cell based upon the input address and the associated cryptographic key and forwarding the service message to the associated service object via the output address;
determining, by the messaging service facility, whether the service requested by the service message is defined within a set of functions on the associated service object and, if so, providing the service in response to the service message;
wherein each cell is associated with one of the service objects and provides a message communication link between the spoke entities and the associated service object;
wherein the spoke entities make service requests to the associated service object using the input address and the associated service object retrieves the service requests using the output address; and
wherein the messaging service facility ensures that the input address is not revealed to the service object and the output address is not revealed to the spoke entities.

10. The method of claim 9, comprising:
generating a communication topology in the message service facility, the communication topology comprising the plurality of cells;
defining a set of functions on the associated service object, the set of functions being associated with the communication topology;
wherein the communication topology is arranged to route the message requesting the service to the set of functions on the service object.

11. The method of claim 10, comprising:
adding an additional spoke entity to the communication topology, wherein the adding comprises generating additional cells associated with the second spoke entity for routing another service message requesting a service from the second spoke entity to the set of functions associated with the communication topology on the associated service object.

12. The method of claim 10, comprising rejecting any service message requesting a service if the service is not provided within the set of functions associated with the communication topology.

* * * * *